Aug. 17, 1965 J. H. WESSELS ETAL 3,201,526

AUTOMATIC ADJUSTMENT OF MAGNETIC HEAD SPACING

Filed Nov. 23, 1960

INVENTORS
JOHANNES. H. WESSELS
JACOB KOORNEEF
BY
Frank R. Jirfari
AGENT

3,201,526
AUTOMATIC ADJUSTMENT OF MAGNETIC HEAD SPACING

Johannes Hendrik Wessels and Jacob Koorneef, Eindhoven, Netherlands, assignors to North American Philips Company, Inc., New York, N.Y., a corporation of Delaware Filed Nov. 23, 1960, Ser. No. 71,309
Claims priority, application Netherlands, Dec. 8, 1959, 246,212
1 Claim. (Cl. 179—100.2)

The invention relates to magnetic recording and/or reproducing apparatus in which provision is made for automatically adjusting the spacing between the magnetic head and a magnetic record carrier adapted to be moved past the head.

In order to record and reproduce oscillations having very small wavelengths the spacing between the magnetic head and the carrier must be made and maintained extremely small, for example of the order of one micron.

For adjusting and maintaining such small spacings between magnetic recording and reproducing heads and the signal tracks on the record carrier, which generally are carried on a revolving drum, neither mechanical nor optical methods are effective.

An adjusted value of one micron can hardly be obtained mechanically, especially since this spacing must be obtained under operating conditions; this is generally hindered by the following factors:

(a) play in the bearings (for precision bearings the play is from two to five microns);
(b) centrifugal expansion of the drum;
(c) lack of circularity and eccentricity of drum and carrier;
(d) difference in expansion due to temperature difference between drum and frame (heat generation by rapidly revolving drum).

The present invention provides an electrical method by which the required exactness and reliability can be obtained; the invention also has the additional advantage that the adjustment of a certain nominal value of the spacing is obtainable independently of the speed of the drum.

According to one aspect of the invention, a metal plate is rigidly secured to the head; in the operative position of the head the metal plate forms a capacitor with the carrier; this capacitor is included in a circuit arrangement so that variations in the value of the capacitance produce corresponding variations in the value of a voltage which controls the spacing between head and carrier.

According to the invention, the said capacitor may be included in one of the branches of a bridge circuit which is balanced only if the spacing has the desired value.

In an alternative embodiment of the invention, the capacitor is connected in the frequency-determining resonant circuit of an oscillator, frequency variations of the output voltage of this oscillator being converted into amplitude variations of the voltage controlling the spacing between head and carrier.

It may be of advantage for the said capacitor to comprise two plates secured to the head and connected to one another by an inductance, the resonant circuit constituted by these components being inductively coupled to an oscillator.

The invention will now be explained more fully with reference to the drawing.

Figure 1:
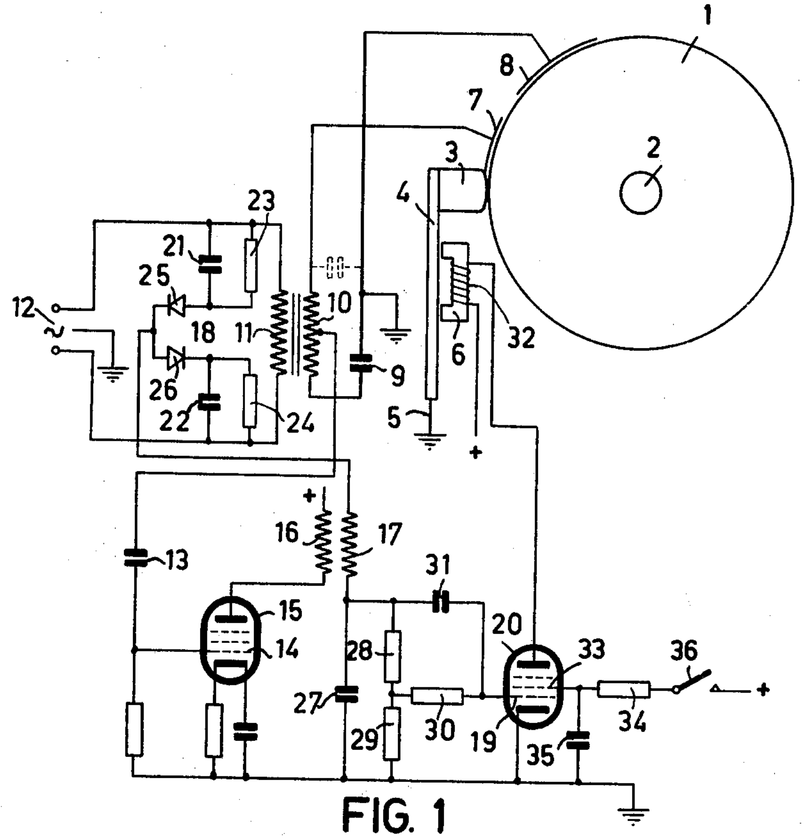
FIGURE 1 shows diagrammatically one embodiment.

In the arrangement shown in FIGURE 1, a sound track (not shown) is arranged on the circumference of a metal drum 1 adapted to revolve about a spindle 2. A recording or reproducing head 3 is held opposite the sound track and spaced therefrom by a distance of, for example, 10 microns by means of an arm 4 secured to a leaf spring 5 fixed at one end. This spacing can be reduced to the desired value by means of an electromagnet 6 arranged beside the arm 4, the electromagnet being energized in a manner described hereinafter.

A metal plate 7 is rigidly secured to the head 3 so as to extend tangentially about the drum with a slight spacing when the head 3 is in its normal operative position. Thus, this plate together with the drum constitutes a capacitor which has a capacitance value that varies with variation in the spacing between the head and the drum. The series combination of this capacitance and a much greater capacitance between the drum and a large plate 8 rigidly disposed opposite the drum constitutes one of the arms of a Wheatstone bridge; the other arms of the bridge comprise a capacitor 9 and the two halves of a coil 10. The value of the capacitor 9 is equal to that of the capacitance between the plate 7 and the drum when the head 3 is spaced by the desired distance from the drum (the far greater capacitance between the plate 8 and the drum can be left out of consideration). Hence, the bridge is balanced only if the head 3 is correctly spaced from the drum. The bridge is fed with alternating current through a coil 11 which is coupled to the coil 10 and is fed from an alternating current source 12.

If the bridge becomes unbalanced due to the spacing between the head and the drum becoming either too great or too small, an alternating voltage, whose magnitude and phase are determined by the magnitude and sense respectively of this distance variation, is set up at the junction of the two coil halves. This alternating voltage is applied through a capacitor 13 to a grid 14 of a tube 15. A coil 16 connected in the anode circuit of this tube is coupled with a coil 17 which has one end connected to the neutral point of a so-called clamping circuit 18 while the other end is connected through a filter to the grid 19 of a tube 20. The clamping circuit comprises two resistors 23 and 24 shunted by capacitors 21 and 22 respectively and two rectifiers 25 and 26. The said filter comprises a capacitor 27 shunting two series-connected resistors 28 and 29 whose junction is connected through a resistor 30 to the grid 19. The resistors 28 and 30 together are shunted by a capacitor 31. The anode circuit of the tube 20 includes an energizing coil 32 for the above-mentioned electromagnet 5.

A second grid of the tube 20, for example a screen grid 33, can be connected by means of a switch 36 through a series resistor 34 and a parallel capacitor 35 to a point of positive potential so that the tube passes current and the magnet 6 attracts the arm 4. In order to prevent the head 3 from striking the drum the time constant of the RC-combination 34–35 is made large.

Variations in the force by which the head 3 is attracted to the drum against the force of the spring 5 depend upon variations in the direct voltage set up across the capacitor 27, the value of this voltage depending upon the balanced or unbalanced condition of the bridge and upon the degree and sense in which this balance is upset.

Thus, by means of the circuit arrangement so far described the value of the capacitance between the plate 7 and the drum is automatically made and maintained equal to the capacitance of the capacitor 9; the latter has a value such that the spacing between the head and the drum has the desired value when the bridge is balanced; this spacing may be as little as one micron.

The above-described arrangement has a limitation in that slight involuntary displacements of the leads connecting the large plate 8 and (especially) the plate 7 to the bridge may influence the latter's balance. This disadvantage is obviated in the modified embodiment which will now be described with reference to FIGURE 2.

Figure 2:
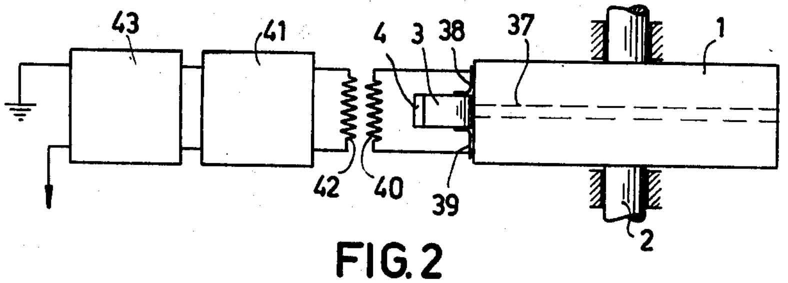
FIGURE 2 shows diagrammatically the main components of another embodiment of the invention.

FIGURE 2 is a plan view of the drum 1 and the spindle 2, a sound track 37 being shown by broken lines. The head 3 on the arm 4 is provided on its sides with plates 38 and 39 respectively which are electrically connected to one another by an inductance 40 rigidly secured to them. The plates 38 and 39 together with the drum constitute two substantially equal capacitances which are connected in series and together with the inductance 40 constitute a resonant circuit the natural frequency of which depends to a great degree upon the spacing between the plates and the drum. This circuit acts as the frequency-determining element of an oscillator 41 to which it is coupled through a coil 42. Hence, variation in the spacing between the head and the drum produces a variation in the frequency of the oscillator which is converted in known manner into a direct voltage variation by means of a discriminator rectifier 43 connected to the oscillator. This direct voltage variation can serve as the control voltage and maintain the spacing between the head and the drum at the desired value, for example, in the manner shown in FIGURE 1.

While the invention has been described with respect to specific embodiments, various changes and modifications thereof will readily occur to those skilled in the art without departing from the inventive concept, the scope of which is set forth in the appended claim.

What is claimed is:

An arrangement for automatically adjusting the spacing between a magnetic surface and a magnetic head spaced from and movable with respect to the surface, comprising: metallic mounting means for said magnetic surface, a first metallic member attached to and movable with said head, a second metallic member fixed in position, each of said first and second metallic members being spaced from said magnetic surface and forming a capacitive coupling with the metallic mounting means, the capacitance of the capacitive coupling of the second metallic member being substantially greater than the capacitance of the capacitive coupling of the first metallic member, an electromagnetic control device cooperating with said head, energizing means for said device including a bridge circuit, the capacitance of said couplings being included in series in one arm of the bridge, circuit means for feeding said bridge with an alternating current source, a clamping circuit fed from said alternating current source, means for balancing said bridge when the spacing has a predetermined value, means for producing a control voltage for application to said control device, the output of said bridge varying the direct voltage at the neutral point of said clamping circuit and said control voltage in response to changes in said spacing from said predetermined value, said control device acting to adjust said spacing in response to a change in control voltage.

References Cited by the Examiner

UNITED STATES PATENTS

| | | | |
|---|---|---|---|
| 2,708,693 | 5/55 | Hendrickson | 179—100.2 |
| 2,787,750 | 4/57 | Jones | 340—174.1 |
| 2,950,354 | 8/60 | Honecker | 179—100.2 |
| 2,972,660 | 2/61 | Toulon | 178—6.6 |
| 2,982,822 | 5/61 | Bacon | 179—100.2 |

FOREIGN PATENTS

| | | |
|---|---|---|
| 758,865 | 10/56 | Great Britain. |

IRVING L. SRAGOW, *Primary Examiner.*

BERNARD KONICK, NEWTON N. LOVEWELL, *Examiners.*